(12) United States Patent
Dong et al.

(10) Patent No.: US 11,836,445 B2
(45) Date of Patent: Dec. 5, 2023

(54) SPREADSHEET TABLE TRANSFORMATION

(71) Applicant: Microsoft Technology Licensing, LLC, Redmond, WA (US)

(72) Inventors: Haoyu Dong, Beijing (CN); Shi Han, Beijing (CN); Dongmei Zhang, Beijing (CN); Jennifer M. Halberstam, Issaquah, WA (US); Xiao Lyu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 9 days.

(21) Appl. No.: 17/627,049

(22) PCT Filed: Aug. 8, 2019

(86) PCT No.: PCT/CN2019/099796
§ 371 (c)(1),
(2) Date: Jan. 13, 2022

(87) PCT Pub. No.: WO2021/022553
PCT Pub. Date: Feb. 11, 2021

(65) Prior Publication Data
US 2022/0366129 A1   Nov. 17, 2022

(51) Int. Cl.
*G06F 17/00* (2019.01)
*G06F 40/18* (2020.01)
(Continued)

(52) U.S. Cl.
CPC .......... *G06F 40/18* (2020.01); *G06F 16/2246* (2019.01); *G06F 40/30* (2020.01)

(58) Field of Classification Search
CPC ........ G06F 40/18; G06F 40/137; G06F 40/30; G06F 16/2246; G06F 16/26; G06F 16/86; G06F 16/2282
See application file for complete search history.

(56) References Cited

U.S. PATENT DOCUMENTS

| | | | | |
|---|---|---|---|---|
| 7,107,519 B1 * | 9/2006 | Webster | .................. | G06F 40/18 |
| | | | | 715/212 |
| 7,461,077 B1 * | 12/2008 | Greenwood | .......... | G06F 3/0482 |
| | | | | 707/999.102 |

(Continued)

FOREIGN PATENT DOCUMENTS

| CN | 103927373 A | 7/2014 |
|---|---|---|
| CN | 106844324 A | 6/2017 |
| CN | 110019224 A | 7/2019 |

OTHER PUBLICATIONS

Shigarov, Alexey O., et al., "Rule-based Spreadsheet Data Transformation from Arbitrary to Relational Tables", Information Systems, Elsevier, Amsterdam, NL, vol. 71, Aug. 14, 2017, pp. 123-136, XP085180538, ISSN: 0306-4379, DOI: 10.1016/J.IS.2017.08.004 (Year: 2017).*

(Continued)

*Primary Examiner* — Laurie A Ries
(74) *Attorney, Agent, or Firm* — Schwegman Lundberg & Woessner, P.A.

(57) ABSTRACT

A solution for spreadsheet table transformation is provided. In this solution, one or more header areas and a data area of a spreadsheet table are detected. A hierarchical structure of each of the header areas is determined by analysis of cell merging and/or indents in the header area, and/or a function relationship between data items in corresponding cells of the data area. The spreadsheet table can be transformed to a relational table based on recognition of the hierarchical structure of the header area. In this way, by facilitating understanding of header structures based on the header hierarchy, it is possible to achieve automated transformation from spreadsheet tables to relational tables.

15 Claims, 7 Drawing Sheets

(51) Int. Cl.
  *G06F 16/22* (2019.01)
  *G06F 40/30* (2020.01)

(56) References Cited

U.S. PATENT DOCUMENTS

| | | | |
|---|---|---|---|
| 10,140,279 B2* | 11/2018 | Zia | G06F 40/106 |
| 10,853,342 B2* | 12/2020 | Kapoor | G06F 16/245 |
| 2003/0097384 A1* | 5/2003 | Hu | G06V 30/414 |
| | | | 715/234 |
| 2004/0103366 A1 | 5/2004 | Peyton-Jones et al. | |
| 2013/0013993 A1* | 1/2013 | Oh | G06F 30/20 |
| | | | 715/212 |
| 2014/0075278 A1* | 3/2014 | Bornea | G06F 40/18 |
| | | | 715/212 |
| 2015/0095312 A1 | 4/2015 | Gulwani | |
| 2015/0363478 A1* | 12/2015 | Haynes | G06Q 10/06 |
| | | | 707/610 |
| 2016/0098415 A1* | 4/2016 | Mejeoumov | G06F 16/13 |
| | | | 707/741 |
| 2017/0139966 A1* | 5/2017 | Azoulay | G06F 40/137 |
| 2017/0242921 A1* | 8/2017 | Rota | G06F 16/353 |
| 2018/0004722 A1* | 1/2018 | Naor | G06F 16/93 |
| 2018/0157468 A1* | 6/2018 | Stachura | G06F 8/34 |
| 2018/0246915 A1 | 8/2018 | Singh et al. | |
| 2019/0278853 A1* | 9/2019 | Chen | G06F 16/2282 |
| 2023/0052634 A1* | 2/2023 | Tomblin | B29C 73/26 |
| 2023/0067944 A1* | 3/2023 | Ares | G06F 16/26 |

OTHER PUBLICATIONS

"Extended Search Report Issued in European Patent Application No. 19940223.1", dated Feb. 8, 2023, 8 Pages.

Shigarov, et al., "Rule-Based Spreadsheet Data Transformation from Arbitrary to Relational Tables", In Journal of Information Systems, vol. 71, Nov. 1, 2017, pp. 123-136.

"International Search Report and Written Opinion Issued in PCT Application No. PCT/CN19/099796", dated May 7, 2020, 10 Pages.

* cited by examiner

| Type and age of householder | Small size | | Large size | | Total households |
|---|---|---|---|---|---|
| | Tow people | Three people | Four people | Five or more | |
| Married-couple families | 25,576 | 11,382 | 12,116 | 8,972 | 58,037 |
| 15 to 34 years | 2,549 | 2,518 | 2,617 | 1,945 | 9,629 |
| 35 to 64 years | 13,662 | 7,865 | 9,192 | 6,726 | 37,445 |
| 65 to 84 years | 8,601 | 985 | 295 | 289 | 10,170 |
| 85 years and over | 755 | 14 | 12 | 12 | 793 |

|   | A | B | C |
|---|---|---|---|
| 1 | Emission Source | Year 1975 | Year 1980 |
| 2 | All Sources | =SUM(B3,B4,B5,B8) | =SUM(C3,C4,C5,C8) |
| 3 | Stationary Sources | 1125.1 | 997.62 |
| 4 | Area-wide Sources | 2500.34 | 2559.87 |
| 5 | On-Road Mobile | =SUM(B6:B7) | =SUM(C6:C7) |
| 6 | Gasoline Vehicles | 35199.45 | 31170.76 |
| 7 | Diesel Vehicles | 69.18 | 124.22 |
| 8 | Other Mobile | =SUM(B9:B11) | =SUM(C9:C11) |
| 9 | Gasoline Fuel | 2228.38 | 2520.78 |
| 10 | Diesel Fuel | 366.02 | 415.28 |
| 11 | Other Fuel | 377.92 | 400.24 |

```
900
```

┌─ 910
DETECT AT LEAST ONE HEADER AREA AND A DATA
AREA OF A SPREADSHEET TABLE

┌─ 920
DETERMINE A HIERARCHICAL STRUCTURE OF THE
DATA ITEMS IN THE AT LEAST ONE HEADER AREA

┌─ 930
TRANSFORM THE SPREADSHEET TABLE INTO AT LEAST
ONE RELATIONAL TABLE BASED ON THE DETERMINED
HIERARCHICAL STRUCTURE

SPREADSHEET TABLE TRANSFORMATION

This application is a U.S. National Stage Application under 35 U.S.C. 371 from International Application Serial No. PCT/CN2019/099796, filed on Aug. 8, 2019, and published as WO 2021/022553 A1 on Feb. 11, 2021, the benefit of priority of which is claimed hereby, and which is incorporated by reference herein in its entirety.

BACKGROUND

Electronic documents often contain spreadsheet tables in order to communicate densely packed, multi-dimensional data. The spreadsheet tables can be edited by employing layout patterns to efficiently indicate data items in a two-dimensional form. Many spreadsheet tables are designed to be interpreted by human and have flexible structures. They usually consist of complex collections of headings, embedded subheadings, and varying cell sizes. However, the rich combination of table structures and content presents difficulties for the spreadsheet tables to be consumed by other tools for complex data analysis, visualization, fault detection, and other processing. In various scenarios, it is expected to transform spreadsheet tables into a unified structure for subsequent processing by machines.

SUMMARY

In accordance with implementations of the subject matter described herein, there is provided a solution for spreadsheet table transformation. In this solution, one or more header areas and a data area of a spreadsheet table are detected. A hierarchical structure of each of the header areas is determined by analysis of cell merging and/or indents in the header area, and/or a function relationship between data items in corresponding cells of the data area. The spreadsheet table can be transformed to a relational table based on recognition of the hierarchical structure of the header area. In this way, by facilitating understanding of header structures based on the header hierarchy, it is possible to achieve automated transformation from spreadsheet tables to relational tables.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The terms "one implementation" and "an implementation" are to be read as "at least one implementation." The term "another implementation" is to be read as "at least one other implementation." The terms "first," "second," and the like may refer to different or same objects. Other definitions, either explicit or implicit, may be included below.

Example Environment

In various scenarios, it is expected to transform a spreadsheet table into a relational table for subsequent processing by machines. Currently, there is a critical step in typical workflows today to manually extract data from the spreadsheet table and covert the data into a unified structure such as a relational table. Such manual extraction and conversion is tedious and time-consuming especially when the table is complicated. There is a lack of automation techniques for transforming spreadsheet tables into relational table due to difficulties in table understanding by machines. In implementations of the subject matter described herein, there is provided a solution for automated spreadsheet table transformation.

Figure 1:
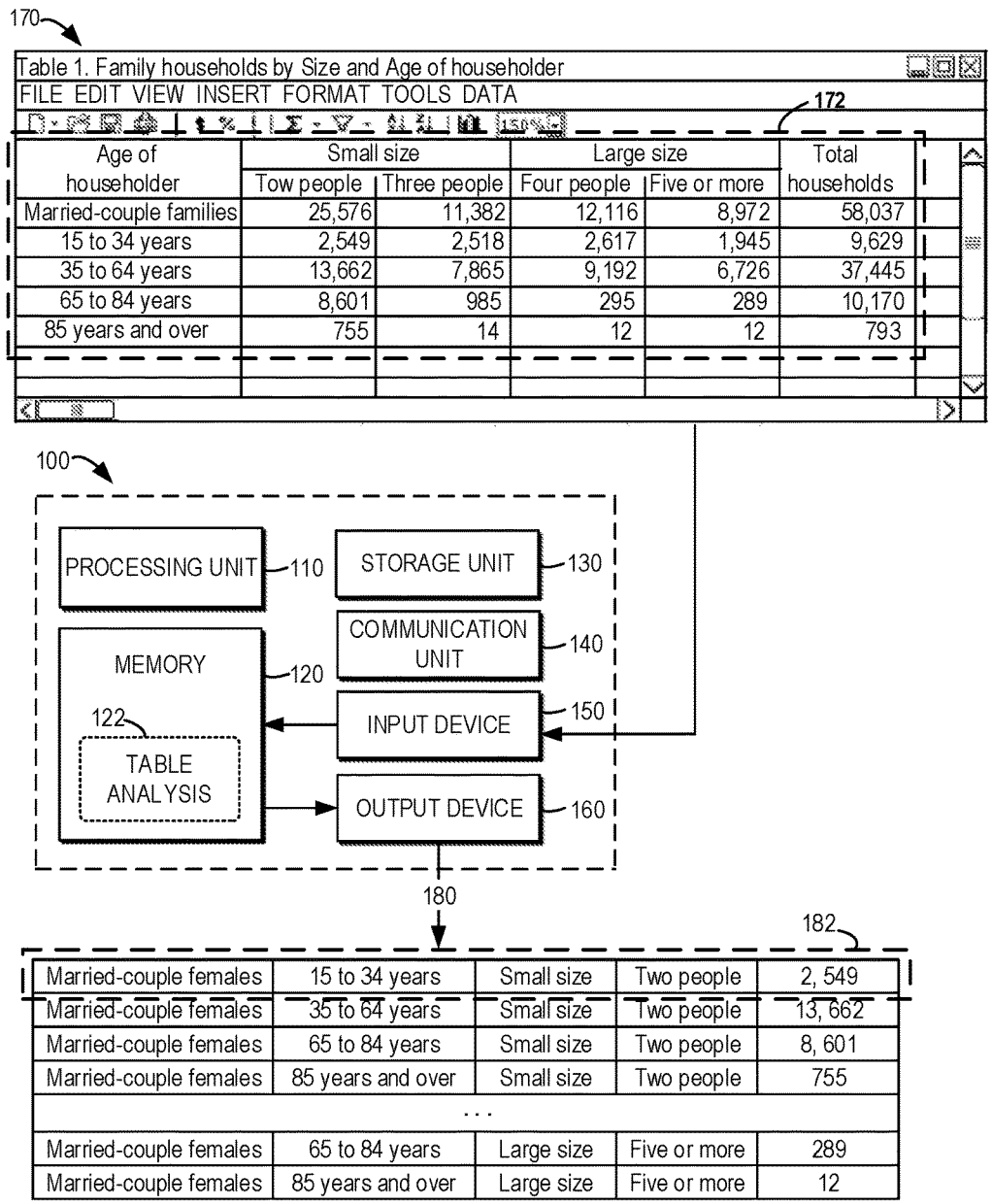
FIG. 1 illustrates a block diagram of a computing device 100 in which various implementations of the subject matter described herein can be implemented.

FIG. 1 illustrates a block diagram of a computing device 100 in which various implementations of the subject matter described herein can be implemented. It would be appreciated that the computing device 100 shown in FIG. 1 is merely for purpose of illustration, without suggesting any limitation to the functions and scopes of the implementations of the subject matter described herein in any manner. As shown in FIG. 1, the computing device 100 includes a general-purpose computing device 100. Components of the computing device 100 may include, but are not limited to, one or more processors or processing units 110, a memory 120, a storage device 130, one or more communication units 140, one or more input devices 150, and one or more output devices 160.

In some implementations, the computing device 100 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 100 can support any type of interface to a user (such as "wearable" circuitry and the like).

The processing unit 110 may be a physical or virtual processor and can implement various processes based on programs stored in the memory 120. In a multi-processor system, multiple processing units execute computer executable instructions in parallel so as to improve the parallel processing capability of the computing device 100. The processing unit 110 may also be referred to as a central processing unit (CPU), a microprocessor, a controller or a microcontroller.

The computing device 100 typically includes various computer storage medium. Such medium can be any medium accessible by the computing device 100, including, but not limited to, volatile and non-volatile medium, or detachable and non-detachable medium. The memory 120 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage device 130 may be any detachable or non-detachable medium and may include a machine-readable medium such as a memory, flash memory drive, magnetic disk or another other media, which can be used for storing information and/or data and can be accessed in the computing device 100.

The computing device 100 may further include additional detachable/non-detachable, volatile/non-volatile memory medium. Although not shown in FIG. 1, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 140 communicates with a further computing device via the communication medium. In addition, the functions of the components in the computing device 100 can be implemented by a single computing cluster or multiple computing machines that can communicate via communication connections. Therefore, the computing device 100 can operate in a networked environment using a logical connection with one or more other servers, networked personal computers (PCs) or further general network nodes.

The input device 150 may be one or more of a variety of input devices, such as a mouse, keyboard, tracking ball, voice-input device, and the like. The output device 160 may be one or more of a variety of output devices, such as a display, loudspeaker, printer, and the like. By means of the communication unit 140, the computing device 100 can further communicate with one or more external devices (not shown) such as the storage devices and display device, with one or more devices enabling the user to interact with the computing device 100, or any devices (such as a network card, a modem and the like) enabling the computing device 100 to communicate with one or more other computing devices, if required. Such communication can be performed via input/output (I/O) interfaces (not shown).

In some implementations, as an alternative of being integrated in a single device, some or all components of the computing device 100 may also be arranged in cloud computing architecture. In the cloud computing architecture, the components may be provided remotely and work together to implement the functionalities described in the subject matter described herein. In some implementations, cloud computing provides computing, software, data access and storage service, which will not require end users to be aware of the physical locations or configurations of the systems or hardware providing these services. In various implementations, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 100 may be used to implement table transformation in implementations of the subject matter described herein. Therefore, hereinafter, the computing device 100 is also referred to as a "table transform device." The memory 120 may include one or more table analysis modules 122 having one or more program instructions. These modules are accessible and executable by the processing unit 110 to perform the functionalities of the various implementations described herein.

When performing the table transformation, the computing device 100 can receive a spreadsheet file 170 through the input device 150. The spreadsheet file 170 contains at least one spreadsheet table 172 for transformation. The table analysis module 122 performs spreadsheet table-to-relational table transformation on the spreadsheet table 172 to generate one or more relational tables 180. The relational table 180 includes a plurality of data records 182 each consisting of data items from the spreadsheet table 172. The relational table 180 arranges the data items in a unified structure. The output device 160 may present the relational table 180 to a viewer or transmit or store the relational table 180 to other devices or database. The relational table 180 may also be stored locally at the computing device 100 for future use.

As used herein, a "spreadsheet table" refers to a table comprising cells or grids in rows and columns with any layout patterns to indicate data values in a two-dimensional form. The spreadsheet table can be generated, edited, and/or presented using a spreadsheet application. As used herein, a "spreadsheet application" refers to an unmodified, commercially available application that is operable to render and process data as a spreadsheet comprising a grid of cells.

Examples of spreadsheet applications include, but are not limited to, Microsoft® Excel and Open Office Calc.

As used herein, a "relational table" has a set of records where each record is referred to as a row of its table. The relational table organizes data in a unified or normalized structure where each record in the same relational table has the same number of data fields. Generally, one or more data fields of a record can form an index for one or more other data fields of the record containing data values. However, some fields in a record may hold no data, indicated by a NULL value. The corresponding data fields of a relational table form a set of columns, which may have specific names that may not be part of the data itself. Each of the data fields of the record may have a specific meaning and thus in some cases, the relational table may have a header record containing header fields for describing the respective data fields. The header record may be placed as the first row of the relational table. A relational table may sometimes be referred to as a database table or a column-major flat table.

As used herein, a "transform" operation from a spreadsheet table to a relational table is to index each of the data values in the spreadsheet table using a relational table. As compared with a spreadsheet table, a relational table is easily analyzed and processed by machines.

It should be appreciated that the spreadsheet table and the relational table illustrated in FIG. 1 are for purpose of illustration only. In other examples, any spreadsheet table may be processed and any relational table may be generated accordingly.

Working Principle and Example Structure for Implementing Table Transform

According to implementations of the subject matter described herein, a solution for spreadsheet table transformation is proposed. In this solution, one or more header areas and a data area of a spreadsheet table are detected. A hierarchical structure of each of the header areas is determined by analysis of cell merging and/or indents in the header area, and/or a function relationship between data items in corresponding cells of the data area. The spreadsheet table can be transformed to a relational table based on recognition of the hierarchical structure of the header area. In this way, by facilitating understanding of header structures based on the header hierarchy, it is possible to achieve automated transformation from spreadsheet tables to relational tables. The basic principles and several example implementations of the subject matter described herein are described below with reference to the figures.

Figures 2, 3:
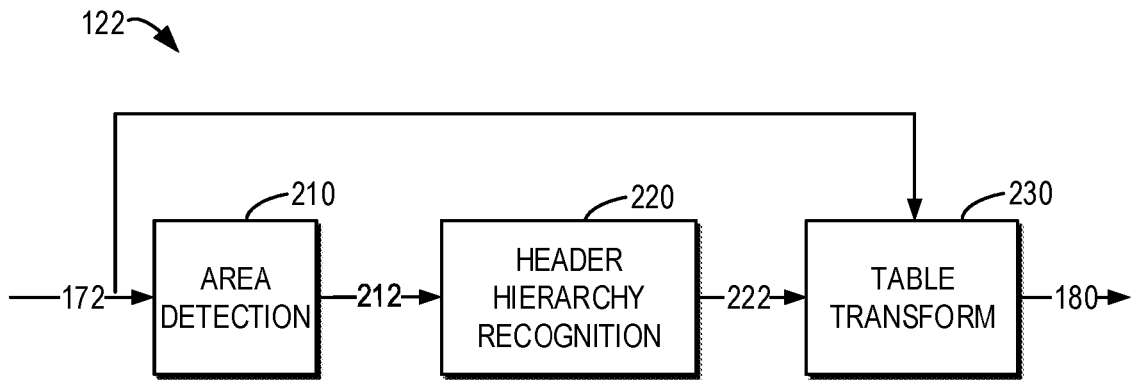
FIG. 2 illustrates a block diagram of a table analysis module according to an implementation of the subject matter described herein.
FIG. 3 illustrates an example of a result in area detection of a spreadsheet table according to an implementation of the subject matter described herein.

Reference is first made to FIG. 2, which illustrates a block diagram of a table analysis module according to an implementation of the subject matter described herein. For purpose of illustration, the table analysis module 122 in the computing device 100 of FIG. 1 is referred as an example for implementing the table transformation described herein. The table analysis module 122 includes a plurality of modules for implementing a plurality of stages in transformation of a spreadsheet table.

To better understand the implementations of the subject matter described herein, some basic concepts related to a spreadsheet table are first introduced.

A spreadsheet table includes cells (or grids) arranged in rows and columns. A cell is the basic component in a table. In some cases, a plurality of cells can be merged into one cell, which is referred to as a merged cell. A merged cell in a row or column may extend over a plurality of cells in a subsequent row or cell; thus, a length of the merged cell may be equal to a total length of the plurality of cells in the subsequent row or cell. Data filled in a cell may be generally referred to as a data item. Some cells in the spreadsheet table may be blank without being filled with any valid value or character. A data item can be a character string or a numerical value in any representation format. The data items and the cells can be organized in various structures and/or presented in various manners supported by the editing tools for spreadsheet tables.

A spreadsheet table typically can be divided into different types of areas, including a title area to present a title of the spreadsheet table, a notation area to present notes related to the table, a data area to present data values, and a header area to index or describe the data values within the data area. Each of the area in the table may consist of one or more cells in one or more rows or columns of the spreadsheet table. The title area and the notation area may be excluded from some spreadsheet tables.

A header area may typically be located at a top side or a left side of the spreadsheet table. A header area located at the top side may be referred to as a top header area, while a header area located at the left side may be referred to as a left header area. It would be appreciated that a header area located at a bottom side or a right side of the spreadsheet table is also possible. A top header area (or a bottom header area) has data items arranged in a row orientation and thus can sometimes be referred to as a row-orientated header area. A left header area (or a right header area) has data items arranged in a column orientation and thus can sometimes be referred to as a column-orientated header area. A spreadsheet table may include more than one header area, for example including both a top header area and a left header area. It is noted that although other types of header area (such as a header area at the bottom side or the right side) are also possible, for ease of description, a top header area and a left header area are described as typical examples of header areas herein.

The inventors have found that data items filled in cells of a header area can be classified into different semantic classes according to their functions in the spreadsheet table. A data item in the header area may function as an index for indexing data items a row or a column of the data area, and thus such index may be considered as a semantic class. For example, in a spreadsheet table containing sales of a product in different countries over last ten years, the names of the countries (such as China, U.S., Australia, and so on) indicated in the table may be respective indices for indexing the sales, and the years (such as 2016, 2017, 2018, and so on) indicated in the table may also be respective indices for indexing the sales together with the names of the counties. In some cases, a data item in the header area may function as an index set name for describing a set of indices for indexing data items in rows or columns of the data area, and thus such index set name may be considered as a semantic class. The set of indices may be in a same row or a same column of the header area, and can be semantically aggregated. For example, "country" is an index set name of the indices China, U.S., Australia, and so on.

Further, a data item in the header area may be a value name for describing data items in a row or a column of the data area, and thus such value name may be considered as a semantic class. This type of data item cannot be used to index data items in the data area as data items in different rows or columns indexed by different index data items may have the same value name. As an example, a value name may be a measure such as "number," "amount," "percent," or a unit of measure such as "meter," "ml," or the like. In some cases, a data item in the header area may be an aggregation name for describing data items in a row or column of the data area that are calculated from data items in at least one further row or column of the data area. An example of such aggregation name may be "total" or "subtotal" describing a data item of a result that is summed up from a plurality of other data items. Other examples may include "maximum," "minimum," "average," "division," or the like. It would be appreciated that the terms of the value name and aggregation name are provided for illustration only, and their variants expressing the same or similar semantics may also be possibly contained in a spreadsheet table.

Some concepts related to a spreadsheet table have been discussed above. The table transformation process can be implemented using the table analysis module 122 in FIG. 2. As shown, the table analysis module 122 includes an area detection phase or module 210, a header hierarchy recognition phase or module 220, and a table transform phase or module 230.

In some implementations, an electronic document or file containing the spreadsheet table 172 may be provided as an input of the table analysis module 122. The table analysis module 122 may first detect the spreadsheet table 172 from the file, such as the spreadsheet file 170. The spreadsheet table 172 in the file 170 may be detected, for example, by determining a bounding box for the spreadsheet table 172 in the file 170. In some implementations, the region of the spreadsheet table 172 in the file 170 may be indicated explicitly or implicitly by a user. Any approaches for automated or manual-assisted table detection, either existing or to be developed in the future, can be employed to detect the range of the spreadsheet table 172 in the electronic document.

With the bounding box of the spreadsheet table 172 determined, the area detection module 210 is configured to detect different types of areas contained in the spreadsheet table 172, especially to detect at least one header area and a data area. A spreadsheet table potentially includes a top header area and/or a left header area. The area detection module 210 may detect whether each of the two types of header areas is contained the spreadsheet table 172. With the one or more header areas detected, the data area of the spreadsheet table can be determined to comprise valid data items in the same rows and/or columns corresponding to the one or more header areas. FIG. 3 shows a detection result on the example spreadsheet table 172 after the detection by the area detection module 210. As shown, upon detection, the spreadsheet table 172 includes a top header area 310-1 and a left header area 310-2 (collectively or individually referred to as header areas 310 of the spreadsheet table 172. The spreadsheet table 127 also includes a data area 320 which containing data items that can be indexed by data items in the header area. The header detection in the area detection module 210 will be discussed in detail below.

The detection result of the area detection module 210, i.e., detection of the header area(s) and the data area, is provided to the header hierarchy recognition module 220. The header hierarchy recognition module 220 is configured to determine a hierarchical structure of the data items in each of the detected header area(s). A hierarchical structure related to a header area may include one or more hierarchical levels, each corresponding to one or more of the data items filled in the cells of the header area. In complicated spreadsheet tables, the header area may be designed as having more hierarchical levels semantically. Recognition of the underlying hierarchical structure of the header area can facilitate understanding of the spreadsheet table and then the table transformation.

In accordance with implementations of the subject matter described herein, a hierarchical structure of data items in a header area is determined based on detection of one or more of the following three features, including cell merging in the header area, indent levels of the cells in the header area, or a function relationship defined in a cell with respect to at least one further cell in the data area. When more than one header area is detected in the spreadsheet table 172, the hierarchical structure of each of the header areas can be determined by the header hierarchy recognition module 220 in a similar manner in parallel or subsequently. Through detection of any of the three features from the header area, it is possible to understand a hierarchy of the data items in each header area. In some implementations, automated semantic analysis of the data items in a header area can be additionally or alternatively applied in the header hierarchy recognition module 220 to determine the header hierarchy. Some implementations of header hierarchy recognition will be discussed in more detail below.

The hierarchical structure of the header area(s) of the spreadsheet table 172 is provided to the table transform module 230 which is configured to transform the spreadsheet table 172 into at least one relational table 180 based on the hierarchical structure(s) of the corresponding header area(s). A relational table is to arrange the data items in the spreadsheet table 172 in a unified structure. In general, a relational table may comprise a plurality of data records each consisting of a plurality of data fields corresponding to data items in the spreadsheet table. Corresponding data fields in the plurality of data records contain data items of the header area that are at a same hierarchical level in the hierarchical structure or data items in the data area indexed by the data items of the header area.

Depending on the hierarchical structure, the spreadsheet table 172 may have one or more possible drill-down levels. Data items in the spreadsheet table 172 may be rearranged from the perspective of the respective drill-down levels to form corresponding relational table. The table transformation based on the hierarchical structure will be discussed in detail below.

It would be appreciated that the modules in FIG. 2 may be implemented as one or more software engines, components, or the like, which are configured with logic for implementing the functionality attributed to the particular module. Each module may be implemented using one or more of such software engines, components or the like. The software engines, components, etc. are executed on one or more processors of one or more computing systems or devices and utilize or operate on data stored in one or more storage devices, memories, or the like, on one or more of the computing systems. In some implementations, different modules in FIG. 2 may be implemented as a single module, and a single module in FIG. 2 may be separated as more than one module. In some implementations, one or more further modules may be included into the table analysis module 122.

Header Area Detection

In detecting one or more header areas in the spreadsheet table, the area detection module 122 may determine whether a separating line in a horizontal direction or in a vertical direction of the spreadsheet table 172 that separates a header area and a data area. A separating line may be considered as a line between the last row of a top header area and the first row of the data area, or a line between the last column of a left header area and the first column of the data area. A top header area may include one or more rows of the spreadsheet table 172, while a left header area may include one or more columns of the spreadsheet table 172. If there is a separating line in the horizontal direction, a top header area is detected as an area containing one or more rows from the first row of the spreadsheet table 172 to the row defining the separating line. Similarly, if there is a separating line in the vertical direction, then a left header area can be detected.

In some implementations, the area detection module 122 may detect one or more of the following characteristics of rows and columns in the spreadsheet table 172 to determine whether there is a top or left header area and which area in the spreadsheet table 172 can be considered as top or left header area. The characteristics may include detection of occurrence of at least one blank value in cells of a row and/or a column of the spreadsheet table 172; data types in cells of a row and/or a column of the spreadsheet table, a relative position of a row and/or a column in the spreadsheet table 172; data transition in a row and/or a column of the spreadsheet table 172, which indicates contrast between data items in adjacent cells; and/or a distribution of numeric values in a row and/or a column of the spreadsheet table 172. By considering one or more of the characteristics related to the rows and/or columns of the spreadsheet table 172, it may be possible to detect a possible row or column at the separating line for the header area.

The characteristics related to the rows and/or columns may be referred to as row/column characteristics, or line characteristics, which may be evaluated from one or more characteristics of cells in the corresponding rows and/or columns. In some implementations, the characteristics of cells that may help in header area detection may include the data items filled in the cells, the types of the data items (by detecting whether the data items is represented in float, integer, or string), and/or representation of numerical values filled in the cells (for example, represented in form of number, date, time, or others). Alternatively, or in addition, other characteristics may be derived from the cells, for example, information about cell merging, cell stylization, semantics of the data items, and the like. Cell stylization may include, for example, font, font color, style, background color, an indent level, spacing, and/or other characteristics defining a presentation manner of a data item in a cell.

In some implementations, the area detection module 210 may apply a machine learning model to detect one or more header area in the spreadsheet table 172 based on the row/column characteristics. Various types of machine leaning models can be applied, examples of which may include a Gradient Boosting Decision Tree (GBDT) model, a Support Vector Machine (SVM), a Random Forest, a neural network, and/or the like. The output of the model is a location of a top header area and/or a left header area within the spreadsheet table 172. For example, the output of the model may indicate whether a line between two rows or two columns is a separating line for a header area and a data area. The row/column characteristics may be directly used as input to the machine learning model in some implementations. In the case that there is one or more blank columns or rows adjoining to the separating line, such blank columns or rows may be considered as a part of the data area. In some other implementations, various other characteristics may be derived from the row/column characteristics to be used as input to the machine learning model as long as those characteristics are considered to be associated with the output of the model. The machine learning model may be pertained using training data. The training data may include various model input and corresponding ground-truth output for known spreadsheet tables.

Header Hierarchy Recognition

As mentioned above, the header hierarchy recognition module 220 determines a hierarchical structure of each detected header area in the spreadsheet table 172 based on one or more of cell merging, indent levels, function relationships, and possibly semantic analysis of data items. The whole or part of the hierarchical structure may be determined based on one of the above factors. In some implementations, the hierarchical structure may be represented as a tree structure with each node representing a data item in the header area.

In some implementations, the header hierarchy recognition module 220 may determine a hierarchical structure of a header area if one or more merged cells occurred in the header area. Upon detection of a merged cell in a row or a column, the header hierarchy recognition module 220 may further determine if there is a subsequent row (in the case of a top header area) or a subsequent column (in the case of a left header area) in the header area. In the case of the subsequent row or column exists, the merged cell extends over a plurality of cells in the subsequent row or column, the header hierarchy recognition module 220 determines a node at a hierarchical level in the hierarchical structure (referred to as a "first" hierarchical level sometimes herein for ease of description only) to represent a data item in the merged cell and a plurality of nodes at a hierarchical level in the hierarchical structure (referred to as a "second" hierarchical level sometimes herein for ease of description only) to represent data items in the plurality of cells respectively. The second hierarchical level is lower than the first hierarchical level. That is, a data item in a merged cell has a higher hierarchical level than data items in the cells in the subsequent row or column over which the merged cell extends. This is a rule that is followed when people designs spreadsheet tables.

Figure 4A:
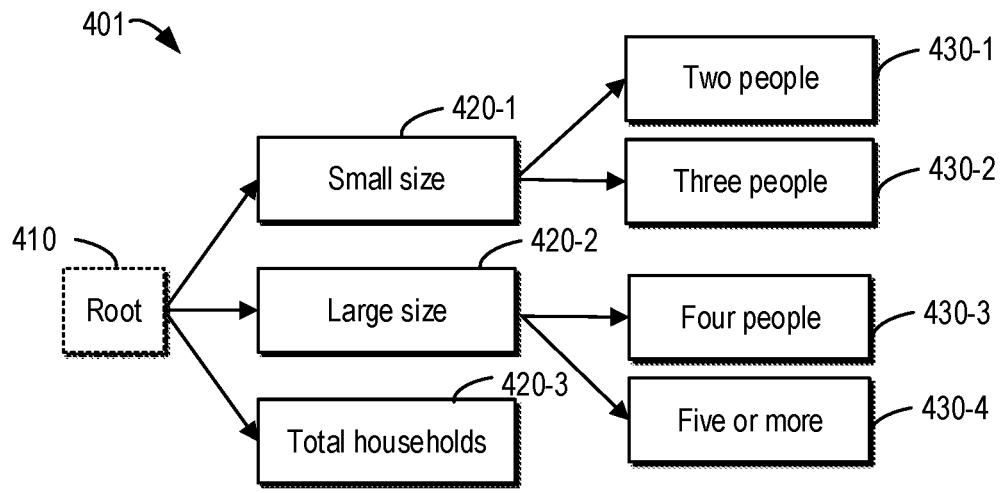
FIGS. 4A and 4B illustrate examples of header hierarchical structures according to an implementation of the subject matter described herein.

In the example spreadsheet table 172 shown in FIG. 1 and FIG. 3, the top header area 310-1 has two merged cells in its first row, which are filled with data items "Small size" and "Large size," respectively. Each of the two merged cells extends over two cells in the subsequent second row. Thus, the data item in the merged cells is at a higher hierarchical level than the data items in the subsequent row covered by the merged cell. FIG. 4A illustrates an example hierarchical structure 401 of the top header area 310-1. As shown, the hierarchical structure 401 includes nodes 420-1 and 420-2 representing data items in the two merged cells in the top header area 310-1. The nodes 420-1 and 420-2 have their child nodes 430-1, 430-2, and child nodes 430-3 and 430-4 representing data items in cells of the header area covered by the merged cells. The nodes 420-1, 420-2 are at the second hierarchical level in the hierarchical structure 401, which is higher than the hierarchical level of the nodes 430-1 to 430-2.

In some implementations, individual data items in the header area that are not related to cell merging may be determined as individual nodes in the hierarchical structure and their hierarchical level may be the same as the one corresponding to the data item at the same row (for the top header area) and the same column (for the left header area). For example, in the structure 401 of FIG. 4A, a node 420-3 representing the data item "Total household" is at the same hierarchical level of the nodes 420-1 and 420-2.

In some examples, if it is not possible to find any specific data item in the header area of the spreadsheet table 172 to be associated with a node required at a determined hierarchical level in the hierarchical structure, a virtual node may be constructed in the hierarchical structure. The virtual node may be a virtual root node of the hierarchical structure in some examples or may be a virtual parent node of a set of child nodes representing a set of data items in the header area. As shown in the example of FIG. 4A, a virtual "root" node 410 is contained in the hierarchical structure 401.

In some implementations, the indent levels in the cells may reflect their hierarchy relationship. The indent level is usually used to determine the hierarchy in a column-orientated header area (a left header area or possibly a right header area). Thus, the header hierarchy recognition module 220 may determine indent levels of data items in a same row of the header area (for example, the left header area). In some examples, an indent level of a cell may be measured by a distance between the left side of the cell and the beginning of the data item filled therein. The larger the measured distance is, the higher the indent level is. Generally, data items in cells having the same indent level have higher probability of being at a same hierarchical level in whole hierarchical structure of a header area, while a data item in a cell having a higher indent level may probably be at a lower hierarchical level than a data item in a cell having a lower indent level.

Specifically, in determining a hierarchical structure of a left header area of the spreadsheet table 172, the header hierarchy recognition module 220 detects that a detection that an indent level of a cell in the header area is lower than an indent level of one or more other cells in the header area. In this case, the header hierarchy recognition module 220 determines a node at a hierarchical level in the hierarchical structure (referred to as a "third" hierarchical level sometimes herein for ease of description only) to represent the data item having a lower indent level and a node at a further hierarchical level in the hierarchical structure (referred to as a "fourth" hierarchical level sometimes herein for ease of description only) to represent the data item having the higher indent level.

In some implementations, the header hierarchy recognition module 220 detects that a plurality of cells in a same column of the left header area have a same indent level and then may determine, at least based on such detection, respective nodes at a same hierarchical level (referred to as a "fifth" hierarchical level sometimes herein for ease of description only) in the hierarchical structure to represent data items in the plurality of cells.

Figure 4B:
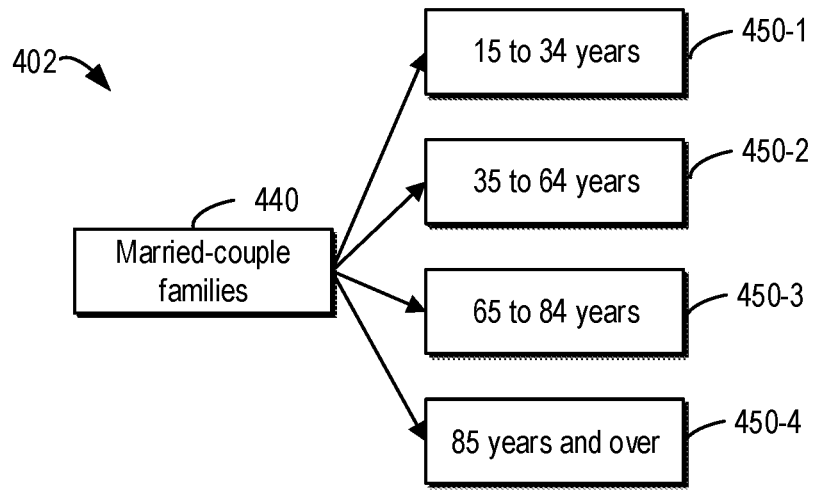

In the example spreadsheet table 172 shown in FIG. 1 and FIG. 3, the left header area 310-2 includes data items arranged using different indent levels. More specifically, the call filled with a data item "Married-couple families" has a lower indent level than indent levels of the following four cells related the ages. In addition, the indent levels of the following four cells are determined to be the same. Accordingly, depending on the indent levels, an example hierarchical structure 402 of the left header area 310-2 is determined as shown in FIG. 4B, where a node 440 representing the data item "Married-couple families" having a lower indent level is at a higher hierarchical level than nodes 450-1 to 450-4 representing data items in the following four cells having higher indent levels.

It would be appreciated that although an example of comparison of two different indent levels is illustrated, in other implementations, the column-oriented header area such as the left header area of the spreadsheet table may contain cells with two or more different indent levels. The hierarchical structure of that header area may be determined accordingly.

As an alternative, or in addition, the header hierarchy recognition module 220 may detect one or more function relationships between data items in different cells of the data area and determine the hierarchical structure of the header area based on the detected function relationships. Many spreadsheet table editing tools provide the user with the options to insert various formulas to calculate a data item from one or more other data items in the data area. A formula may represent a function relationship between the data items, which indicates an operation to be performed on one or more data items to calculate the resulting data item. Some examples of the function relationship may include summing up, dividing, maximizing, minimizing, a conditional function, and/or the like.

The function relationship between data items in the data area can reflect a kind of hierarchy in the corresponding data items in the header area. Accordingly, upon detection that a function relationship defined in a first cell with respect to at least one second cell in the data area, the header hierarchy recognition module 220 may determine one or more nodes at a hierarchical level in the hierarchical structure (referred to as a "sixth" hierarchical level sometimes herein for ease of description only) to represent a corresponding data item in a cell of the header area and at least one node at a hierarchical level in the hierarchical structure (referred to as a "seventh" hierarchical level sometimes herein for ease of description only) to represent a corresponding data item in a cell of the header area. A data item in the header area corresponding to a data item in the data area is the one that indexes or describes the data item in the data area, which two data items may be in the same column (in the case of a top header area) or in the same row (in the case of a left header area).

The sixth and seventh hierarchical levels may be at the same level or at different levels, depending on the type of the function relationship. In the case of different levels, the sixth hierarchical level may be higher than or lower than the seventh hierarchical level. In some examples, if the function relationship indicates an operation of summing up, the sixth hierarchical level may be higher than the seventh hierarchical level. If the function relationship indicates an operation of averaging, maximizing, or minimizing of multiple data items or an operation of dividing a data item, the sixth hierarchical level may be equal to the seventh hierarchical level. The mapping between a difference or equality of the two hierarchical levels and different types of the function relationship may be preconfigured.

Figures 5A, 5B:
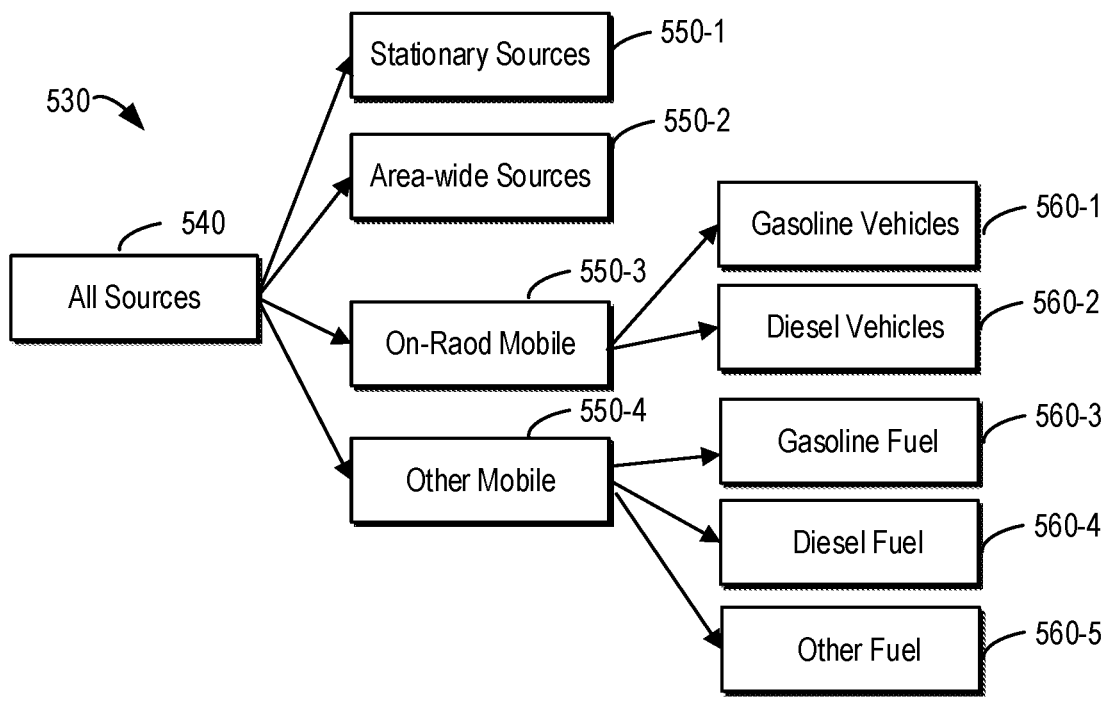
FIG. 5A illustrates a further example of a spreadsheet table with formula displayed instead of resulting value according to an implementation of the subject matter described herein.
FIG. 5B illustrates an example of header hierarchical structure of the spreadsheet table in FIG. 5A according to an implementation of the subject matter described herein.

To illustrate the determination of the hierarchical structure based on the function relationship, FIG. 5A illustrates a different example of the spreadsheet table 172 with its left header area 510 and data area 520 detected. Specifically, as highlighted in FIG. 5A, a summing formula is inserted in a cell indexed by Column B and Row 2 (represented by "B2" and the locations of other cells can be similarly represented), indicating that the data value in this cell B2 is a sum of data values in four other cells B3, B4, B5, B8 in the data area 520. A similar summing formula is inserted in a cell C2 in the same row of the cell B2. As such, the header hierarchy recognition module 220 may determine that a data item "All Sources" in the header area 510 corresponding to the data item in the cell B2 and C2 is at a higher hierarchical level, while data items "Stationary Sources," "Area-wide Sources," "On-Road Mobile," and "Other Mobiles" in the header area 510 corresponding to data items in the cells B3, B4, B5, and B8 are at a lower hierarchical level with their nodes connected to the node representing the data item "All Sources." Similarly, summing formulas are detected in cells B5 and C5 in the same row and in cells B8 and C8 in another row, indicating each of data values in the cells is a sum of data values in other cells.

FIG. 5B illustrates a hierarchical structure 530 recognized from the left header area 510 based on function relationships detected in the data area of this example spreadsheet table 172. A node 540 representing the data item at the cell A2 in the header area 510 is at a higher hierarchical level, and nodes 550-1 to 550-4 representing data items at the cells A3, A4, A5, and A8 in the header area 510 is at a relatively lower hierarchical level as child nodes of the node 540. Similarly, the node 550-3 has two child nodes 560-1, 560-2 at a lower hierarchical level representing the data items at the cells A6 and A7, and the node 550-4 has three child nodes 560-3, 560-4, 560-5 at a lower hierarchical level representing the data items at the cells A9 to A11.

In some implementations, the header hierarchy recognition module 220 may perform semantics analysis on the data items contained in the header area to support detection of the header hierarchy. The semantic analysis may help determine whether a plurality of data items in a header area have parallel semantic meanings or belong to a higher semantic role. For example, if a sequence of data items {Apple, Banana, Orange, Pear, China, US} are included in a header area, by means of the semantic analysis, the header hierarchy recognition module 220 may determine that a set of data items {Apple, Banana, Orange, Pear} are at a same hierarchical level, which may be lower than a hierarchical level corresponding to the virtual node of "fruit" if such data item is not included in the header area. It may also be determined that a set of data items {China, US} are at a same hierarchical level, which may be lower than a virtual hierarchical level corresponding to "country" if such data item is not included in the header area.

The above implementations have described the determination of hierarchical levels in a hierarchical structure for a header area based on various factors including cell merging, indent levels, and/or functional relationships. The hierarchy results of the determination process based on different factors can be aggravated to form a complete hierarchical structure of a header area.

In some implementations, a machine learning-based approach may be applied to predict the correct hierarchy from the results. For example, a machine-learning model may be trained and applied if there is inconsistency in the hierarchy results determined from the factors. In addition, the machine-learning model may further help deal with some spreadsheet tables where the cell merging, indents, and/or function relationship are not found in the header area or are not sufficient to detect the header hierarchy. For example, if a cell is not actually merged but is visually designed to have an effect of "merging" and extends across a plurality of other cells, the machine-learning model may be trained to facilitate prediction of the corresponding hierarchy levels related to those cells. In some implementations, user intervention or confirmation may be required when such inconsistency is found to invite the user to adjust or confirm the hierarchical structure based on human understanding on the header area of the spreadsheet table.

In some implementations, in addition to the hierarchical structure, the header hierarchy recognition module 220 may be further configured to determine respective semantic classes of the data items in the header area(s) of the spreadsheet table 172 and thus marks the nodes of the hierarchical structure representing the data items as having the corresponding semantic classes. The semantic classes for the data items in a header area may be those as mentioned above, including an index for indexing data items a row or a column of the data area, an index set name for describing a set of indices for indexing data items in rows or columns of the data area, a value name for describing data items in a row or a column of the data area, an aggregation name for describing data items in a row or column of the data area that are calculated from data items in at least one further row or column of the data area. The semantic classes marked for the nodes in the header area may also be used in the table transformation in the table transform module 230.

To determine the semantic classes of the data items, the header hierarchy recognition module 220 may further identify one or more sets of nodes linked in a tree structure in a parent-child relationship and constructs a plurality of predetermined semantic patterns for each of the set of nodes. Each semantic pattern indicates a different combination of semantic classes for respective nodes in the parent-child relationship. For example, for a set of nodes with a parent node and two child nodes, the semantic patterns may be determined as {index set name, index, index}, {index, index, aggregation name}, {index, value name, vale name}, where the first semantic class in the above lists is for the parent node, while the remaining semantic classes are for the child nodes.

The header hierarchy recognition module 220 may then determine respective semantic matching levels between the tree structure and a plurality of predetermined semantic patterns. A semantic matching level may be determined by measuring whether each of semantic classes in a semantic pattern matches with the corresponding node in the tree structure and then summing up the number of the matched semantic classes found in the semantic pattern. In some cases, the semantic matching level may be determined by measuring an overall matching probability of a semantic pattern matching with respective nodes in the tree structure. If the semantic matching level indicates that all or majority of the semantic classes in a pattern match with the nodes in the tree structure or the overall matching probability exceeds a threshold, the header hierarchy recognition module 220 determines that the semantic classes of the set of nodes in the tree structure as the corresponding semantic classes indicated in that pattern. In some implementations, a pre-trained machine learning model may be applied to determine the semantic matching level between the tree structure and a semantic pattern. The use of the semantic classes of the nodes will be described in the table transformation process below.

Table Orientation Detection

Figures 6, 7:
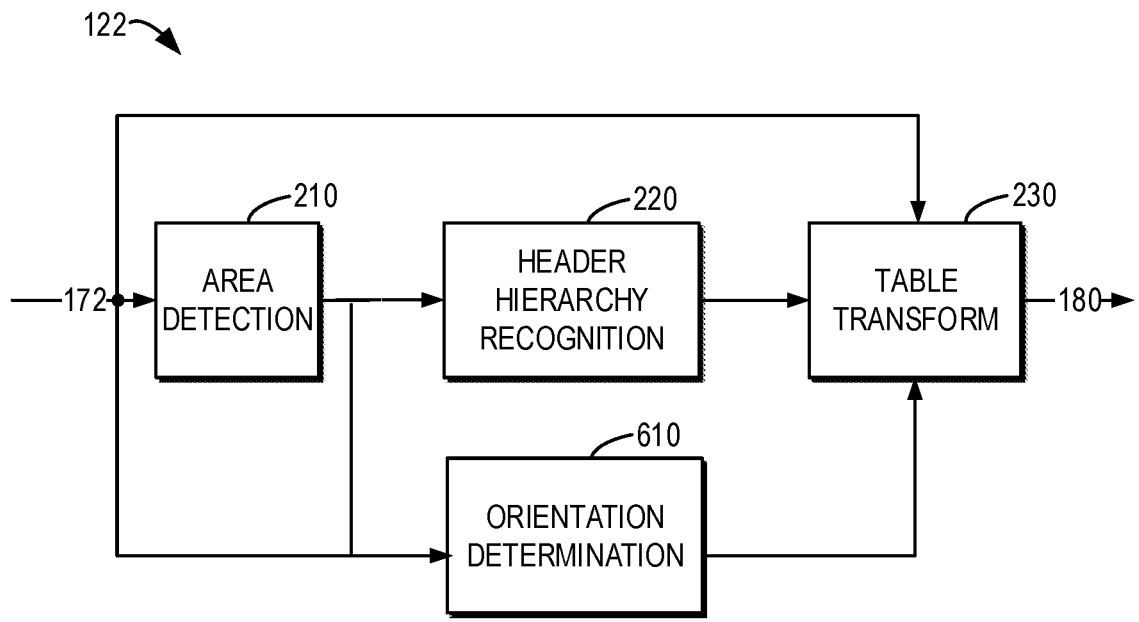
FIG. 6 illustrates a block diagram of a table analysis module according to another implementation of the subject matter described herein.
FIG. 7 illustrates an example user interface according to an implementation of the subject matter described herein.

In some implementations, during the table transform process, it is further expected to determine an orientation of data arrangement in the spreadsheet table 172. Generally, an orientation of data arrangement in a table may include a column-major orientation, a row-major orientation, or a cross orientation in rows and columns. The table analysis module 122 may further include a module to implement such table orientation detection. FIG. 6 illustrates an example of the table analysis module 122 in such implementations. As shown, the table analysis module 122 further includes an orientation determination module 610 to determine an orientation of data arrangement in the spreadsheet table 172. The orientation determination module 610 may need the detection result of the area detection module 210 and the spreadsheet table 172 as input.

In some implementations, the orientation determination module 610 may detect whether a significant consistence of representation formats of data items in a row direction and/or a column direction of the data area. If the data items in the data area have exactly same representation formats in a row direction, in a column direction, or in both direction, then the orientation determination module 610 may determine that the spreadsheet table 172 has a row-major orientation, a column-major orientation, or a cross orientation in rows and columns. Generally, a cross orientation may have both a top header area and a left header area.

If the representation formats of the data items cannot indicate a significant consistence, or as an alternative, one or more other rules can be utilized by the orientation determination module 610. For example, the orientation determination module 610 may detect whether there is a consistence of data types in the row direction and/or the column direction of the data area, whether there are too many blank cells of the at least one header area in a row direction and/or a column direction of the at least one header area (for example, the number of blank cells exceeds a threshold number), and/whether a length of data in the row direction or the column direction of the data area is long enough (for example, higher than a predetermined length threshold). Depending on one or more of the results of the detection/ determination, the orientation determination module 610 may determine the orientation of data arrangement in the spreadsheet table 172. For example, the example spreadsheet table 172 shown in FIG. 1 and FIG. 2 has a cross orientation in rows and columns.

In some implementations, the orientation determination module 610 may also apply a machine learning model to predict whether the input spreadsheet table 172 has a row-major orientation, a column-major orientation, or a cross orientation. The machine learning model may be trained to explore from the above mentioned rules and/or feature information related to any other aspects of the header and data areas to determine the orientation of the spreadsheet table 172. Various machine learning models for classification may be employed in this aspect.

In some implementations, in addition of being used in the table transformation phase, the resulting orientation of data arrangement from the orientation determination module 610 may be used to guide the determination of the header hierarchy by the header hierarchy recognition module 220. For example, if it is determined that the spreadsheet table 172 has a column-major orientation, the hierarchical structure of the column-orientated header area (such as a left header area if any) may not be recognized as it may be simple or even not existed in tables with such column-major orientation. The header hierarchy recognition module 220 may only need to determine the hierarchical structure of the row-orientated header area (such as the tope header area). Similarly, if it is determined that the spreadsheet table 172 has a row-major orientation, the hierarchical structure of the row-orientated header area (if any) may not be specifically recognized and only recognition of the hierarchical structure of the column-orientated header area is required.

Table Transformation

The table transform module 230 is configured to transform the spreadsheet table 172 into at least one relational table 180 based on the hierarchical structure(s) of the corresponding header area(s).

In some implementations, if the orientation of data arrangement in the spreadsheet table 172 indicates a cross-orientation, and the spreadsheet table includes a row-orientated header area and a column-orientated header area (such as a top header area and a left header area), the table transform module 230 may perform an unpivoting operation on the spreadsheet table 172. If the hierarchical structure of the top header area and/or a left header area includes more than one hierarchical level, there may be more than one drill-down levels for the unpivoting operation. All the possible drill-down levels may be an enumerated number of combinations of the hierarchical levels in both hierarchical structures. Specifically, the table transform module 230 may select a first hierarchical level from the hierarchical structure of the column-orientated header area and a second hierarchical level from the hierarchical structure of the row-orientated header area, and then unpivot the spreadsheet table 172 with respect to the first and second hierarchical levels (referred to as a drill-down level pair) to obtain a relational table. The relational table may comprise data items in the hierarchical level and its higher hierarchical level in the header area, and data items in the data area that are indexed or described by those data items.

In some implementations, if there are missing data items in a target drill-down level, there are some optional approaches to deal with this situation. Specifically, in the transformed table for a drill-down level k, if a group of data items in one or more column or rows at the level k are absent, the corresponding data items may not be shown in the transformed relational table, including the data items at the immediately available higher levels. As a second option, the data items may be shown as blank in the transformed relational table. Alternatively, data items corresponding to the immediately available higher-level header may be copies and filled into the cells of the transformed table as the data items of the current drill-down level. In an implementation, the user can specify, for example, through a user input, which of the above options can be applied when generating and presenting the transformed table.

If the spreadsheet table 172 has a column-major orientation and there are more than one hierarchical levels in the hierarchical structure (which means that the table is not flat), then all data items corresponding to one or more hierarchical levels (from the root node to the leaf node) in the hierarchical structure may be concatenated as a new flat header of the table. Such table may be output as a relational table. If the spreadsheet table 172 has a row-major orientation, the spreadsheet table 172 may be first transposed as a new spreadsheet table having a column-major orientation and then the new spreadsheet table may be transformed to a rational table in a similar way as a spreadsheet table having the column-major orientation.

In some implementations, in the table transformation, if a header area includes a data item corresponding to an aggregation name, the spreadsheet table 172 may be transformed to generate a relational table comprising a plurality of data records to record one of the data items in the row or column of the data area and at least one data item in the header area for indexing the data item in the data area.

In some implementations, in the table transformation, if a header area of the spreadsheet table 172 includes one or more data items corresponding to an index set name, a value name, and/or an aggregation name, a header record may be created in the relational table which includes data fields to indicate the one or more data items corresponding to the index set name, the value name, and/or the aggregation name, so as to describe the following records in the same data fields.

In some implementations, among the plurality of data records of a relational table, if the data field contains the data item filled in a cell in a header area of the spreadsheet table, the data item is copied from the cell. If the data field contains the data item filled in a cell of the data area, the data item in the cell of the data area may be referenced in the relational table such that the data item in the data field changes as the data item in the cell of the data area changes.

Application of Table Transformation and User Interactions

The functionalities of the table analysis module 122 described herein may be implemented as a separate application or an add-in component in other application. In some implementations, specific user interfaces may be presented to the user to indicate the results of one or more of the phrases during the table transformation process.

In an implementation, after one or more relational tables 180 are determined, the relational tables 180 and possibly the original spreadsheet table 172 may be presented to the user upon a specific request or automatically. For each of the relational tables 180, the data items in the header area corresponding to the hierarchical level may be highlighted in the spreadsheet table 172, and the corresponding data fields in the relational table 180 may also be highlighted. For example, as shown in FIG. 7, if the relational table 180 is constructed according to the hierarchical level having the nodes related to ages in the left header area, and a hierarchical level having the nodes related to family sizes in the top header area, the corresponding column and row are highlighted in different manners in the spreadsheet table 172 while the corresponding data fields are also heighted. Further, the data items in the data area of the spreadsheet table 172 and the corresponding data fields of the relational table 180 may also be heighted as shown in FIG. 7. This can enable the user to easily recognize the correspondence between the data in the two tables.

In some implementations, user interactions are allowed to guide or control the table transformation process. In an implementation, in determining the header hierarchical structure, a raw hierarchical structure of the header area automatically determined by the header hierarchy recognition module 220 may be presented to the user. The presentation may be triggered every time when a hierarchical structure is determined for a user, or may be triggered when the header hierarchy recognition module 220 finds certain inconsistency between results determined from different related factors, as mentioned above. The user is allowed to adjust the presented hierarchical structure. Upon receipt of a modification to the raw hierarchical structure from the user, modifying the raw hierarchical structure based on the modification to generate the hierarchical structure and adjust the raw hierarchical structure accordingly. In this way, it is flexible for the user to control the table understanding and facilitate the correct structure recognition.

Figure 8A:
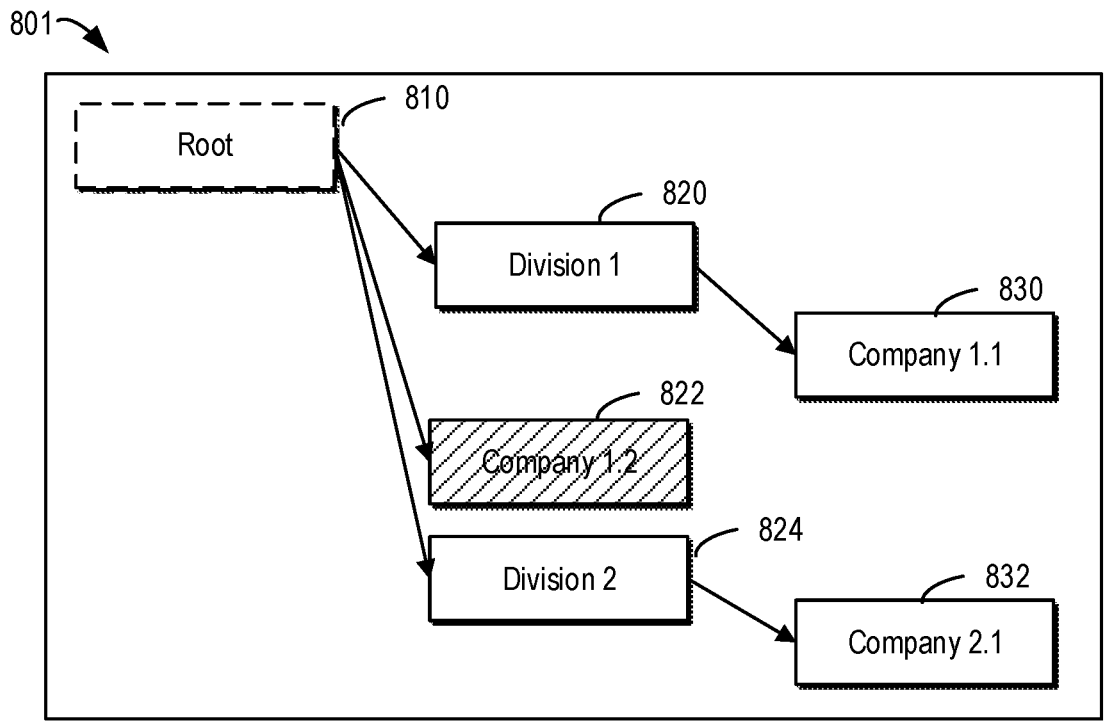
FIGS. 8A-8C illustrate example user interfaces according to an implementation of the subject matter described herein.
Figure 8B:
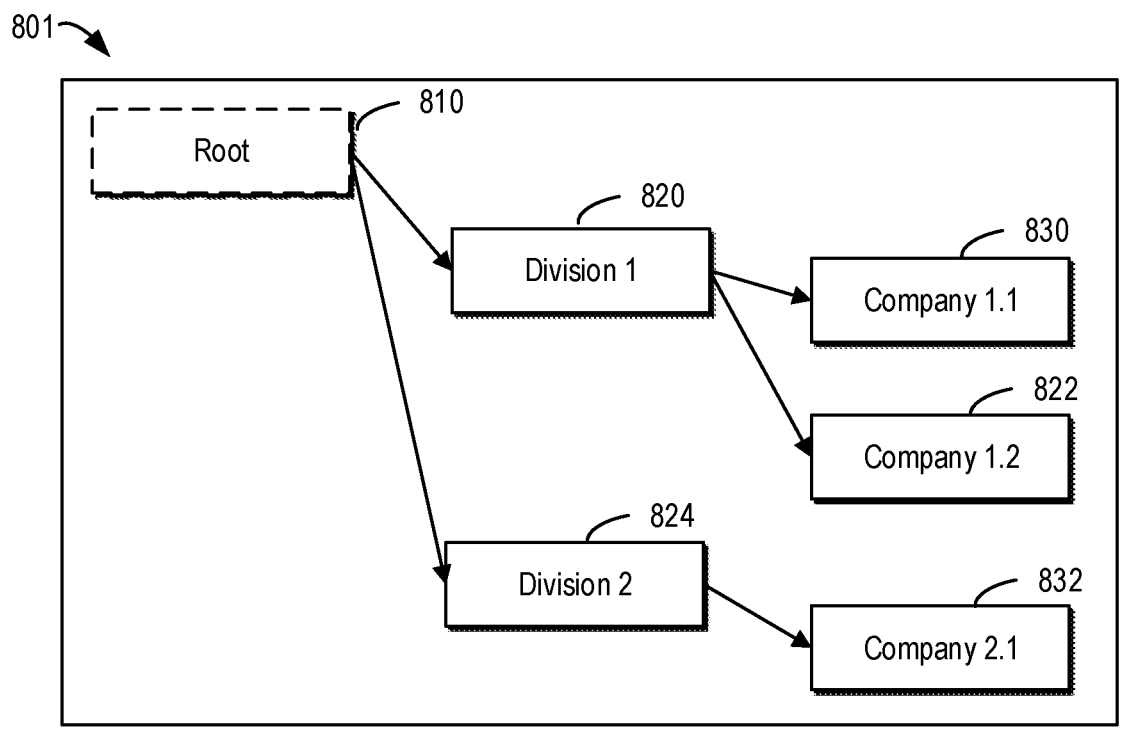

FIG. 8A shows an example user interface 801 presenting a raw hierarchical structure determined for a header area of a spreadsheet table. In the raw hierarchical structure, nodes 820, 822, 824 are determined to be child nodes at a lower hierarchical level of a root node 810 and nodes 830 and 832 are determined to be respective child nodes of the nodes 820 and 824. The user may indicate, through a specific user input, that the node 822 should be at a lower hierarchical level of the node 820 as its child node. Upon receiving the user input, the hierarchical structure may be modified accordingly in the user interface 801 as shown in FIG. 8B.

In an implementation, the user is allowed to define how the spreadsheet table is transformed. For example, the hierarchical structure of one or more header areas may be presented to the user and the user is allowed to flexibly select which hierarchical levels or one or more nodes in the hierarch level he/she expects the spreadsheet table is drilled down from. Upon receiving the user selection, the table transform module 230 may determine the hierarchical level or the nodes selected by the user and transform the spreadsheet table with respect to one or more columns and/or rows corresponding to the use selection.

Figures 8C, 9:
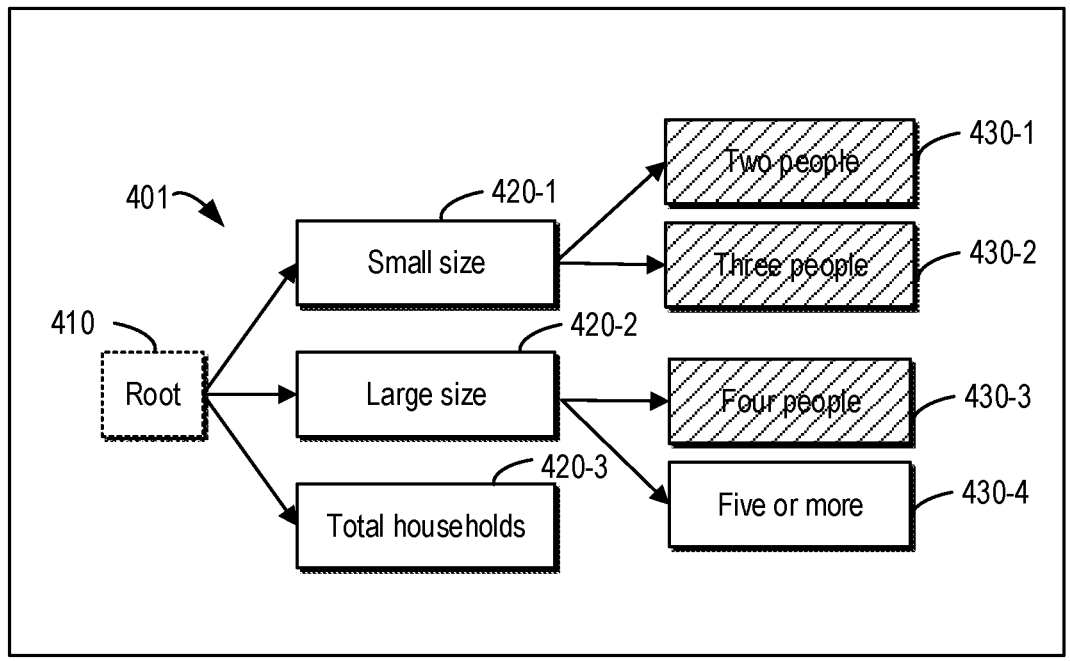
FIG. 9 illustrates a flowchart of a process for table transformation according to an implementation of the subject matter described herein.

FIG. 8C illustrates an example user interface 802 presenting a hierarchical structure of a header area for user selection. In this example, the hierarchical structure in the example of FIG. 4A is presented. The user is allowed to select a whole hierarchical level or specifically select one or more (but not all) nodes at a hierarchical level to indicate his/her intention for table transformation. For example, as shown in FIG. 8C, the user selects three nodes (not all the four nodes) at the last hierarchical level. Accordingly, the spreadsheet table 172 (i.e., the example table shown in FIG. 1 and FIG. 3) may be transformed with respect to the rows in the header area corresponding to the three selected nodes. The data items corresponding to the index "Five or more" in the spreadsheet table will not be contained in the relational table.

Example Process

FIG. 9 illustrates a flowchart of a process 900 of table transformation according to some implementations of the subject matter as described herein. The process 900 may be implemented by the computing device 100, for example, by the table analysis module 122 in the computing device 110. The process 900 may also be implemented by any other devices or device clusters similar to the computing device 100. For purpose of description, the process 900 is described with reference to FIG. 1.

At block 910, the computing device 100 detects at least one header area and a data area of a spreadsheet table, the spreadsheet table comprising data items filled in cells arranged in rows and columns, the at least one header area comprising cells filled with data items for indexing or describing data items in cells of the data area. At block 920, the computing device 100 determines a hierarchical structure of the data items in the at least one header area by detection of at least one of the following: cell merging in the at least one header area, indent levels of the cells of the at least one header area, or a function relationship defined in a cell with respect to at least one further cell in the data area. At block 930, the computing device 100 transforms the spreadsheet table into at least one relational table based on the determined hierarchical structure, the at least one relational table having the data items of the spreadsheet table arranged in a unified structure.

In some implementations, determining the hierarchical structure of the at least one header area further comprises determining the hierarchical structure based on semantic analysis of the data items in the header area.

In some implementations, detecting the at least one header area of the spreadsheet table comprises: detecting at least one of the following characteristics in the spreadsheet table: occurrence of at least one blank value in a row or a column of the spreadsheet table, data types in cells of a row or a column of the spreadsheet table, a relative position of a row or a column in the spreadsheet table, data transition in a row or a column of the spreadsheet table, or a distribution of numeric values in a row or a column of the spreadsheet table; and determining the at least one header area in the spreadsheet table based on the at least one detected characteristic.

In some implementations, the method 900 further comprises determining respective semantic classes of the data items in the at least one header area, the respective semantic classes being selected from a group consisting of the following: an index for indexing data items a row or a column of the data area, an index set name for describing a set of indices for indexing data items in rows or columns of the data area, a value name for describing data items in a row or a column of the data area, an aggregation name for describing data items in a row or column of the data area that are calculated from data items in at least one further row or column of the data area; and wherein transforming the spreadsheet table comprises transforming the spreadsheet table further based on the determined semantic classes of the data items.

In some implementations, the hierarchical structure is represented as a tree structure, the tree structure comprising at least one set of nodes linked together in a parent-child relationship, each of the nodes representing data item in the at least one header area; and determining the respective semantic classes comprises: for a given set of the at least one set of nodes, determining respective semantic matching levels between the tree structure and a plurality of predetermined semantic patterns, each of the plurality of predetermined semantic patterns indicating a different combination of semantic classes for respective nodes in the parent-child relationship; in response to one of the determined semantic matching levels meeting a predetermined condition, determining the semantic classes indicated by the corresponding semantic pattern for the data items represented by the given set of nodes.

In some implementations, determining the hierarchical structure comprises: for each of the at least one header area, in response to detecting that occurrence of cell merging in the header area, detecting whether a first merged cell in a row or a column of the header area extends over a plurality of second cells in a subsequent row or a subsequent column of the header area; and determining, based at least in part on a detection that the first merged cell extends over the plurality of second cells, a first node at a first hierarchical level in the hierarchical structure to represent a data item in the first merged cell and a plurality of second nodes at a second hierarchical level in the hierarchical structure to represent data items in the plurality of second cells, the second hierarchical level being lower than the first hierarchical level.

In some implementations, determining the hierarchical structure comprises: in response to determine that one of the at least one header area is a column-orientated header area, performing at least one of the following: determining, based at least in part on a detection that an indent level of a third cell in the header area is lower than an indent level of a fourth cell in the header area, a third node at a third hierarchical level in the hierarchical structure to represent a data item in the third cell and a fourth node at a fourth hierarchical level in the hierarchical structure to represent a data item in the fourth cell; and/or determining, based at least in part on a detection that a plurality of fifth cells in a column of the header area have a same indent level, determining respective nodes at a fifth hierarchical level in the hierarchical structure to represent data items in the plurality of fifth cells.

In some implementations, determining the hierarchical structure comprises: for each of the at least one header area, determining, based at least in part on a detection that a function relationship defined in a first cell with respect to at least one second cell in the data area, a sixth node at a sixth hierarchical level in the hierarchical structure to represent a data item in a sixth cell in the header area and at least one seventh node at a seventh hierarchical level in the hierarchical structure to represent a data item in a seventh cell in the header area, a difference between the sixth and seventh hierarchical levels being based on a type of the function relationship, wherein the data item in the sixth cell indexes or describes a data item in the first cell in the data area, and the data item in the seventh cell indexes or describes a data item in the at least one second cell in the data area.

In some implementations, determining the hierarchical structure comprises: for each of the at least one header area, determining a raw hierarchical structure of the header area based on the detection; presenting the raw hierarchical structure to a user; in response to receiving a modification to the raw hierarchical structure from the user, modifying the raw hierarchical structure based on the modification to generate the hierarchical structure; and in response to receiving a confirmation to the raw hierarchical structure from the user, determining the raw hierarchical structure as the hierarchical structure.

In some implementations, the method further comprises determining an orientation of data arrangement in the spreadsheet table based on at least one of the following: detection of a consistence of representation formats of data items in a row direction and/or a column direction of the data area, detection of a consistence of data types in the row direction and/or the column direction of the data area, the number of blank cells of the at least one header area in a row direction and/or a column direction of the at least one header area exceeding a threshold number, or a determination of a length of data in the row direction or the column direction of the data area being higher than a predetermined length threshold, and wherein the orientation of data arrangement is one of a column-major orientation, a row-major orientation, or a cross orientation in rows and columns, and wherein transforming the spreadsheet table further comprises transforming the spreadsheet table further based on the orientation of data arrangement.

In some implementations, transforming the spreadsheet table further based on the orientation of data arrangement comprises: in response to the orientation of data arrangement being the cross orientation in rows and columns and the at least one header area comprising a row-orientated header area and a column-orientated header area, selecting a first hierarchical level from the hierarchical structure of the column-orientated header area and a second hierarchical level from the hierarchical structure of the row-orientated header area; unpivoting the spreadsheet table with respect to the first and second hierarchical levels to obtain a relational table.

In some implementations, transforming the spreadsheet table comprises: in response to one of the at least one header area comprising a data item corresponding to an aggregation name for describing data items in a row or column of the data area that are calculated from data items in at least one further row or column of the data area, transforming the spreadsheet table to generate a relational table comprising a plurality of data records, each of the plurality of data records comprising one of the data items in the row or column of the data area and at least one data item in the header area for indexing the data item in the data area.

In some implementations, transforming the spreadsheet table comprises: presenting the hierarchical structure to a user; in response to receiving a selection of at least one part of a hierarchical level from the hierarchical structure by the user, determining at least one column or row corresponding to the at least one part of the hierarchical level in the at least one header area; and transforming the spreadsheet table with respect to the at least one determined column or row to construct the relational table.

In some implementations, transforming the spreadsheet table comprises: in response to the at least one header area comprising a data item corresponding to at least one of an index set name, a value name, or an aggregation name, constructing a header record of the relational table comprising a data field to indicate at least one of the index set name, the value name, or the aggregation name, wherein the index set name describes a set of indices for indexing data items in rows or columns of the data area, the value name describes data items in a row or a column in the data area, and the aggregation name describes data items in a row or column of the data area that are calculated from data items in at least one further row or column of the data area.

In some implementations, the plurality of data records comprising a first data field that contains a data item copied from a cell in a corresponding row or column of the at least one header area and a second data field that contains a data item referring to a data item in a cell of the data area, the data item in the second data field changes as the data item in the cell of the data area changes.

EXAMPLE IMPLEMENTATIONS

Some example implementations of the subject matter described herein are listed below.

In a first aspect, the subject matter described herein provides a computer-implemented method. The method comprises detecting at least one header area and a data area of a spreadsheet table, the spreadsheet table comprising data items filled in cells arranged in rows and columns, the at least one header area comprising cells filled with data items for indexing or describing data items in cells of the data area; determining a hierarchical structure of the data items in the at least one header area by detection of at least one of the following: cell merging in the at least one header area, indent levels of the cells of the at least one header area, or a function relationship defined in a cell with respect to at least one further cell in the data area; and transforming the spreadsheet table into at least one relational table based on the determined hierarchical structure, the at least one relational table having the data items of the spreadsheet table arranged in a unified structure.

In some implementations, determining the hierarchical structure of the at least one header area further comprises determining the hierarchical structure based on semantic analysis of the data items in the header area.

In some implementations, detecting the at least one header area of the spreadsheet table comprises: detecting at least one of the following characteristics in the spreadsheet table: occurrence of at least one blank value in a row or a column of the spreadsheet table, data types in cells of a row or a column of the spreadsheet table, a relative position of a row or a column in the spreadsheet table, data transition in a row or a column of the spreadsheet table, or a distribution of numeric values in a row or a column of the spreadsheet table; and determining the at least one header area in the spreadsheet table based on the at least one detected characteristic.

In some implementations, the method further comprises determining respective semantic classes of the data items in the at least one header area, the respective semantic classes being selected from a group consisting of the following: an index for indexing data items a row or a column of the data area, an index set name for describing a set of indices for indexing data items in rows or columns of the data area, a value name for describing data items in a row or a column of the data area, an aggregation name for describing data items in a row or column of the data area that are calculated from data items in at least one further row or column of the data area; and wherein transforming the spreadsheet table comprises transforming the spreadsheet table further based on the determined semantic classes of the data items.

In some implementations, the hierarchical structure is represented as a tree structure, the tree structure comprising at least one set of nodes linked together in a parent-child relationship, each of the nodes representing data item in the at least one header area; and determining the respective semantic classes comprises: for a given set of the at least one set of nodes, determining respective semantic matching levels between the tree structure and a plurality of predetermined semantic patterns, each of the plurality of predetermined semantic patterns indicating a different combination of semantic classes for respective nodes in the parent-child relationship; in response to one of the determined semantic matching levels meeting a predetermined condition, determining the semantic classes indicated by the corresponding semantic pattern for the data items represented by the given set of nodes.

In some implementations, determining the hierarchical structure comprises: for each of the at least one header area, in response to detecting that occurrence of cell merging in the header area, detecting whether a first merged cell in a row or a column of the header area extends over a plurality of second cells in a subsequent row or a subsequent column of the header area; and determining, based at least in part on a detection that the first merged cell extends over the plurality of second cells, a first node at a first hierarchical level in the hierarchical structure to represent a data item in the first merged cell and a plurality of second nodes at a second hierarchical level in the hierarchical structure to represent data items in the plurality of second cells, the second hierarchical level being lower than the first hierarchical level.

In some implementations, determining the hierarchical structure comprises: in response to determine that one of the at least one header area is a column-orientated header area, performing at least one of the following: determining, based at least in part on a detection that an indent level of a third cell in the header area is lower than an indent level of a fourth cell in the header area, a third node at a third hierarchical level in the hierarchical structure to represent a data item in the third cell and a fourth node at a fourth hierarchical level in the hierarchical structure to represent a data item in the fourth cell; and/or determining, based at least in part on a detection that a plurality of fifth cells in a column of the header area have a same indent level, determining respective nodes at a fifth hierarchical level in the hierarchical structure to represent data items in the plurality of fifth cells.

In some implementations, determining the hierarchical structure comprises: for each of the at least one header area, determining, based at least in part on a detection that a function relationship defined in a first cell with respect to at least one second cell in the data area, a sixth node at a sixth hierarchical level in the hierarchical structure to represent a data item in a sixth cell in the header area and at least one seventh node at a seventh hierarchical level in the hierarchical structure to represent a data item in a seventh cell in the header area, a difference between the sixth and seventh hierarchical levels being based on a type of the function relationship, wherein the data item in the sixth cell indexes or describes a data item in the first cell in the data area, and the data item in the seventh cell indexes or describes a data item in the at least one second cell in the data area.

In some implementations, determining the hierarchical structure comprises: for each of the at least one header area, determining a raw hierarchical structure of the header area based on the detection; presenting the raw hierarchical structure to a user; in response to receiving a modification to the raw hierarchical structure from the user, modifying the raw hierarchical structure based on the modification to generate the hierarchical structure; and in response to receiving a confirmation to the raw hierarchical structure from the user, determining the raw hierarchical structure as the hierarchical structure.

In some implementations, the method further comprises determining an orientation of data arrangement in the spreadsheet table based on at least one of the following: detection of a consistence of representation formats of data items in a row direction and/or a column direction of the data area, detection of a consistence of data types in the row direction and/or the column direction of the data area, the number of blank cells of the at least one header area in a row direction and/or a column direction of the at least one header area exceeding a threshold number, or a determination of a length of data in the row direction or the column direction of the data area being higher than a predetermined length threshold, and wherein the orientation of data arrangement is one of a column-major orientation, a row-major orientation, or a cross orientation in rows and columns, and wherein transforming the spreadsheet table further comprises transforming the spreadsheet table further based on the orientation of data arrangement.

In some implementations, transforming the spreadsheet table further based on the orientation of data arrangement comprises: in response to the orientation of data arrangement being the cross orientation in rows and columns and the at least one header area comprising a row-orientated header area and a column-orientated header area, selecting a first hierarchical level from the hierarchical structure of the column-orientated header area and a second hierarchical level from the hierarchical structure of the row-orientated header area; unpivoting the spreadsheet table with respect to the first and second hierarchical levels to obtain a relational table.

In some implementations, transforming the spreadsheet table comprises: in response to one of the at least one header area comprising a data item corresponding to an aggregation name for describing data items in a row or column of the data area that are calculated from data items in at least one further row or column of the data area, transforming the spreadsheet table to generate a relational table comprising a plurality of data records, each of the plurality of data records comprising one of the data items in the row or column of the data area and at least one data item in the header area for indexing the data item in the data area.

In some implementations, transforming the spreadsheet table comprises: presenting the hierarchical structure to a user; in response to receiving a selection of at least one part of a hierarchical level from the hierarchical structure by the user, determining at least one column or row corresponding to the at least one part of the hierarchical level in the at least one header area; and transforming the spreadsheet table with respect to the at least one determined column or row to construct the relational table.

In some implementations, transforming the spreadsheet table comprises: in response to the at least one header area comprising a data item corresponding to at least one of an index set name, a value name, or an aggregation name, constructing a header record of the relational table comprising a data field to indicate at least one of the index set name, the value name, or the aggregation name, wherein the index set name describes a set of indices for indexing data items in rows or columns of the data area, the value name describes data items in a row or a column in the data area, and the aggregation name describes data items in a row or column of the data area that are calculated from data items in at least one further row or column of the data area.

In some implementations, the plurality of data records comprising a first data field that contains a data item copied from a cell in a corresponding row or column of the at least one header area and a second data field that contains a data item referring to a data item in a cell of the data area, the data item in the second data field changes as the data item in the cell of the data area changes.

In a second aspect, the subject matter described herein provides an electronic device. The electronic device comprises a processing unit; and a memory coupled to the processing unit and having instructions stored thereon which, when executed by the processing unit, cause the electronic device to perform any of the steps of the above-mentioned method.

In a third aspect, the subject matter described herein provides a computer program product tangibly stored on a computer storage medium and comprising machine-executable instructions which, when executed by a device, cause the device to perform the method according to the aspect in the first aspect. The computer storage medium may be a non-transitory computer storage medium.

In a fourth aspect, the subject matter described herein provides a non-transitory computer storage medium having machine-executable instructions stored thereon, the machine-executable instruction, when executed by a device, causing the device to perform the method according to the aspect in the first aspect.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A computer-implemented method, comprising:
    detecting at least one header area and a data area of a spreadsheet table, the spreadsheet table comprising data items filled in cells arranged in rows and columns, the at least one header area comprising cells filled with data items for indexing or describing data items in cells of the data area;
    determining a hierarchical structure of the data items in the at least one header area;
    causing presentation, in a user interface, of the hierarchical structure to a user;
    receiving, via the user interface, a user selection of a hierarchical level or at least one node in the hierarchical level for transformation; and
    transforming the spreadsheet table into at least one relational table based on the user selection, the at least one relational table having the data items of the spreadsheet table associated with the selected hierarchical level or at least one node in the hierarchical level arranged in a unified structure.

2. The method of claim 1, wherein determining the hierarchical structure of the at least one header area further comprises:
    determining the hierarchical structure based on semantic analysis of the data items in the header area.

3. The method of claim 1, wherein detecting the at least one header area of the spreadsheet table comprises:
    detecting at least one of the following characteristics in the spreadsheet table:
        occurrence of at least one blank value in a row or a column of the spreadsheet table,
        data types in cells of a row or a column of the spreadsheet table,
        a relative position of a row or a column in the spreadsheet table,
        data transition in a row or a column of the spreadsheet table, or
        a distribution of numeric values in a row or a column of the spreadsheet table; and
    determining the at least one header area in the spreadsheet table based on the at least one detected characteristic.

4. The method of claim 1, further comprising:
    determining respective semantic classes of the data items in the at least one header area, the respective semantic classes being selected from a group consisting of:
        an index for indexing data items a row or a column of the data area,
        an index set name for describing a set of indices for indexing data items in rows or columns of the data area,
        a value name for describing data items in a row or a column of the data area, and
        an aggregation name for describing data items in a row or column of the data area that are calculated from data items in at least one further row or column of the data area;
    wherein transforming the spreadsheet table comprises transforming the spreadsheet table further based on the determined semantic classes of the data items.

5. The method of claim 4, wherein the hierarchical structure is represented as a tree structure, the tree structure comprising at least one set of nodes linked together in a parent-child relationship, each of the nodes representing a data item in the at least one header area; and
    wherein determining the respective semantic classes comprises:
        for a given set of the at least one set of nodes,
            determining respective semantic matching levels between the tree structure and a plurality of predetermined semantic patterns, each of the plurality of predetermined semantic patterns indicating a different combination of semantic classes for respective nodes in the parent-child relationship; and
            in response to one of the determined semantic matching levels meeting a predetermined condition, determining the semantic classes indicated by the corresponding semantic pattern for the data items represented by the given set of nodes.

6. The method of claim 1, wherein determining the hierarchical structure comprises:
    for each of the at least one header area,
    in response to detecting that occurrence of cell merging in the header area, detecting whether a first merged cell in a row or a column of the header area extends over a plurality of second cells in a subsequent row or a subsequent column of the header area; and
    determining, based at least in part on a detection that the first merged cell extends over the plurality of second cells, a first node at a first hierarchical level in the hierarchical structure to represent a data item in the first merged cell and a plurality of second nodes at a second hierarchical level in the hierarchical structure to represent data items in the plurality of second cells, the second hierarchical level being lower than the first hierarchical level.

7. The method of claim 1, wherein determining the hierarchical structure comprises:
    in response to determining that one of the at least one header area is a column-orientated header area,
        determining, based at least in part on a detection that an indent level of a first cell in the header area is lower than an indent level of a second cell in the header area, a first node at a first hierarchical level in the hierarchical structure to represent a data item in the first cell and a second node at a second hierarchical level in the hierarchical structure to represent a data item in the second cell; or determining, based at least in part on a detection that a plurality of third cells in a column of the header area have a same indent level, determining respective nodes at a third hierarchical level in the hierarchical structure to represent data items in the plurality of third cells.

8. The method of claim 1, wherein determining the hierarchical structure comprises:

for each of the at least one header area, determining, based at least in part on a detection that a function relationship defined in a first cell with respect to at least one second cell in the data area, a third node at a third hierarchical level in the hierarchical structure to represent a data item in a third cell in the header area and at least one fourth node at a fourth hierarchical level in the hierarchical structure to represent a data item in a fourth cell in the header area, a difference between the third and fourth hierarchical levels being based on a type of the function relationship, wherein the data item in the third cell indexes or describes a data item in the first cell in the data area, and the data item in the fourth cell indexes or describes a data item in the at least one second cell in the data area.

9. The method of claim 1, wherein determining the hierarchical structure comprises:

for each of the at least one header area, determining a raw hierarchical structure of the header area based on the detection;

presenting the raw hierarchical structure to a user;

in response to receiving a modification to the raw hierarchical structure from the user, modifying the raw hierarchical structure based on the modification to generate the hierarchical structure; and in response to receiving a confirmation to the raw hierarchical structure from the user, determining the raw hierarchical structure as the hierarchical structure.

10. The method of claim 1, further comprising:

determining an orientation of data arrangement in the spreadsheet table based on at least one of the following:

detection of a consistence of representation formats of data items in a row direction or a column direction of the data area, detection of a consistence of data types in the row direction or the column direction of the data area, a number of blank cells of the at least one header area in a row direction or a column direction of the at least one header area exceeding a threshold number, or a determination of a length of data in the row direction or the column direction of the data area being higher than a predetermined length threshold, and wherein the orientation of data arrangement is one of a column-major orientation, a row-major orientation, or a cross orientation in rows and columns, and wherein transforming the spreadsheet table further comprises transforming the spreadsheet table further based on the orientation of data arrangement.

11. The method of claim 10, wherein transforming the spreadsheet table further based on the orientation of data arrangement comprises:

in response to the orientation of data arrangement being the cross orientation in rows and columns and the at least one header area comprising a row-orientated header area and a column-orientated header area, selecting a first hierarchical level from the hierarchical structure of the column-orientated header area and a second hierarchical level from the hierarchical structure of the row-orientated header area; and unpivoting the spreadsheet table with respect to the first and second hierarchical levels to obtain a relational table.

12. The method of claim 1, wherein transforming the spreadsheet table comprises:

in response to one of the at least one header area comprising a data item corresponding to an aggregation name for describing data items in a row or column of the data area that are calculated from data items in at least one further row or column of the data area, transforming the spreadsheet table to generate a relational table comprising a plurality of data records, each of the plurality of data records comprising one of the data items in the row or column of the data area and at least one data item in the header area for indexing the data item in the data area.

13. The method of claim 1, wherein transforming the spreadsheet table comprises:

determining at least one column or row corresponding to the selected hierarchical level or at least one node in the hierarchical level in the at least one header area; and transforming the spreadsheet table with respect to the at least one determined column or row to construct the at least one relational table.

14. An electronic device, comprising:

a processing unit; and a memory coupled to the processing unit and having instructions stored thereon which, when executed by the processing unit, cause the electronic device to perform operations comprising:

detecting at least one header area and a data area of a spreadsheet table, the spreadsheet table comprising data items filled in cells arranged in rows and columns, the at least one header area comprising cells filled with data items for indexing or describing data items in cells of the data area;

determining a hierarchical structure of the data items in the at least one header area;

causing presentation, in a user interface, of the hierarchical structure to a user;

receiving, via the user interface, a user selection of a hierarchical level or at least one node in the hierarchical level for transformation; and transforming the spreadsheet table into at least one relational table based on the user selection, the at least one relational table having the data items of the spreadsheet table associated with the selected hierarchical level or at least one node in the hierarchical level arranged in a unified structure.

15. A computer program product being tangibly stored on a computer storage medium and comprising machine-executable instructions which, when executed by a device, cause the device to perform operations comprising:

detecting at least one header area and a data area of a spreadsheet table the spreadsheet table comprising data items filled in cells arranged in rows and columns, the at least one header area comprising cells filled with data items for indexing or describing data items in cells of the data area;

determining a hierarchical structure of the data items in the at least one header area;

causing presentation in a user interface, of the hierarchical structure to a user;

receiving, via the user interface, a user selection of a hierarchical level or at least one node in the hierarchical level for transformation: and transforming the spreadsheet table into at least one relational table based on the user selection, the at least one relational table having the data items of the spreadsheet table associated with the selected hierarchical level or at least one node in the hierarchical level arranged in a unified structure.

\* \* \* \* \*